(12) United States Patent
Halasz et al.

(10) Patent No.: US 7,434,044 B2
(45) Date of Patent: Oct. 7, 2008

(54) FAST RE-AUTHENTICATION WITH DYNAMIC CREDENTIALS

(75) Inventors: David E. Halasz, Stow, OH (US); Glen W. Zorn, Everett, WA (US)

(73) Assignee: Cisco Technology, Inc.

( * ) Notice: Subject to any disclaimer, the term of this patent is extended or adjusted under 35 U.S.C. 154(b) by 671 days.

(21) Appl. No.: 10/373,128

(22) Filed: Feb. 26, 2003

(65) Prior Publication Data

US 2004/0168054 A1    Aug. 26, 2004

(51) Int. Cl.
  *H04L 9/00*    (2006.01)
  *H04L 9/32*    (2006.01)
  *G06F 7/04*    (2006.01)
  *G06F 17/30*   (2006.01)
  *G06K 9/00*    (2006.01)
(52) U.S. Cl. .................... 713/155; 713/150; 726/2
(58) Field of Classification Search ......... 380/277–286; 726/2–7, 21; 713/150
  See application file for complete search history.

(56) References Cited

U.S. PATENT DOCUMENTS

| 5,862,481 | A |   | 1/1999 | Kulkarni et al. |
| 6,034,618 | A | * | 3/2000 | Tatebayashi et al. ......... 340/5.8 |
| 2002/0138551 | A1 | * | 9/2002 | Erickson ..................... 709/203 |
| 2003/0182431 | A1 | * | 9/2003 | Sturniolo et al. ............ 709/227 |
| 2004/0010714 | A1 | * | 1/2004 | Stewart ...................... 713/201 |

FOREIGN PATENT DOCUMENTS

WO    WO 01/78351    10/2001

OTHER PUBLICATIONS

International Search Report Mailed Aug. 4, 2004 releated to PCT/US2004/004998 international filing date Feb. 20, 2004.
Henry Haverinen et al.; Cellular Access Control and Charging for Mobile Operator Wireless Local Area Networks; IEEE Wireless Communications; vol. 9; No. 6; Dec. 2002; p. 52-60.

* cited by examiner

*Primary Examiner*—Nasser Moazzami
*Assistant Examiner*—Chinwendu C Okoronkwo
(74) *Attorney, Agent, or Firm*—Tucker Willis & West LLP

(57) ABSTRACT

A proxy server that is inserted between a plurality of network access servers, typically an access points, and an authentication server. When an original authentication request is received by an network access server, the network access server forwards the request to the proxy server which forwards the request to an authentication server. The authentication server then sends the session information to the proxy server which stores the keying material as a dynamic credentials. When the client re-authenticates with one of the plurality of access servers, the re-authentication request is handled by the proxy server using the dynamic credentials. The proxy server may re-authenticate the client using a different method than the method that was originally used. For example, the original authentication may be by Extensible Authentication Protocol-Transport Layer Security (EAP-TLS) and subsequent reauthentications may use Wi-Fi Protected Access (WPA).

13 Claims, 5 Drawing Sheets

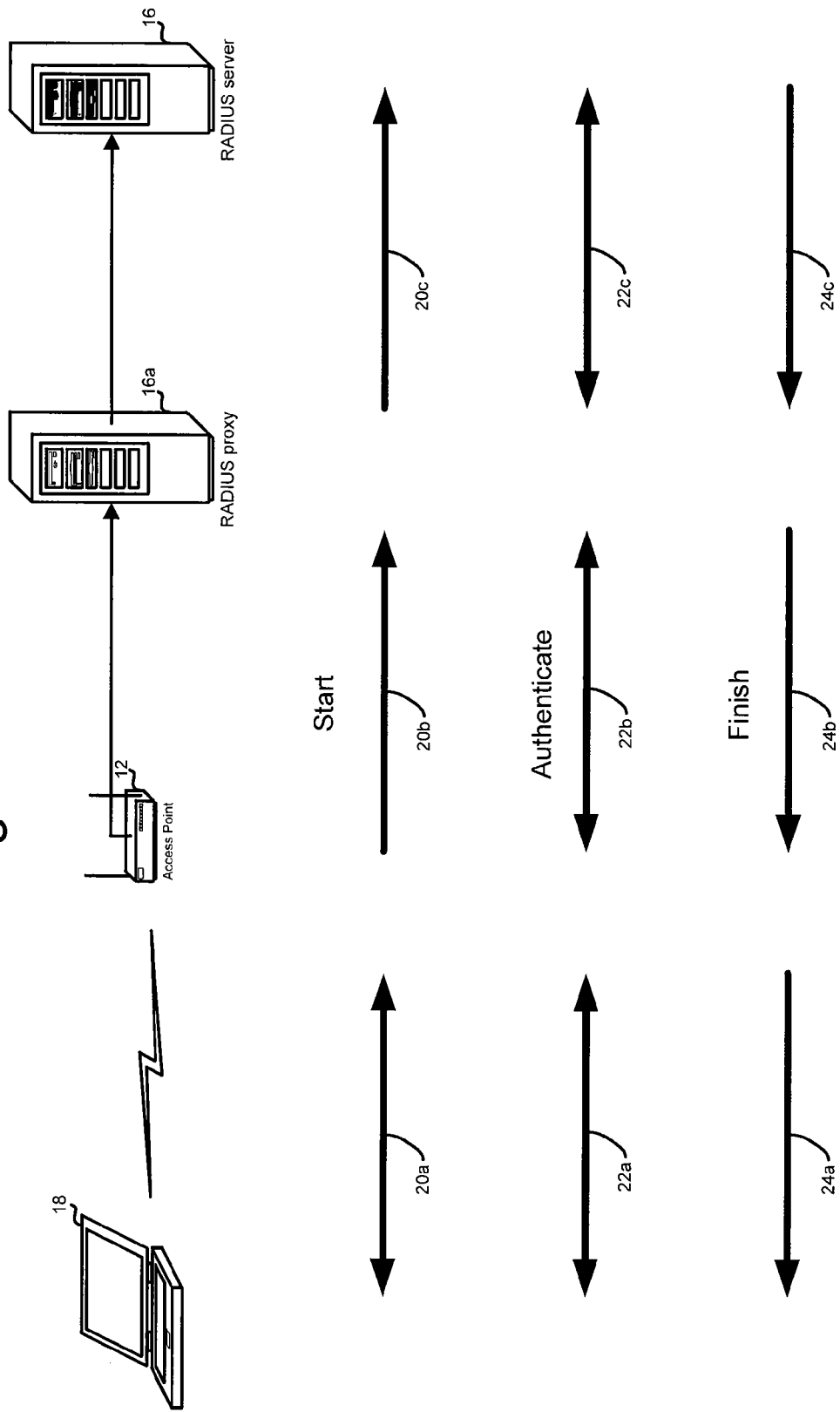

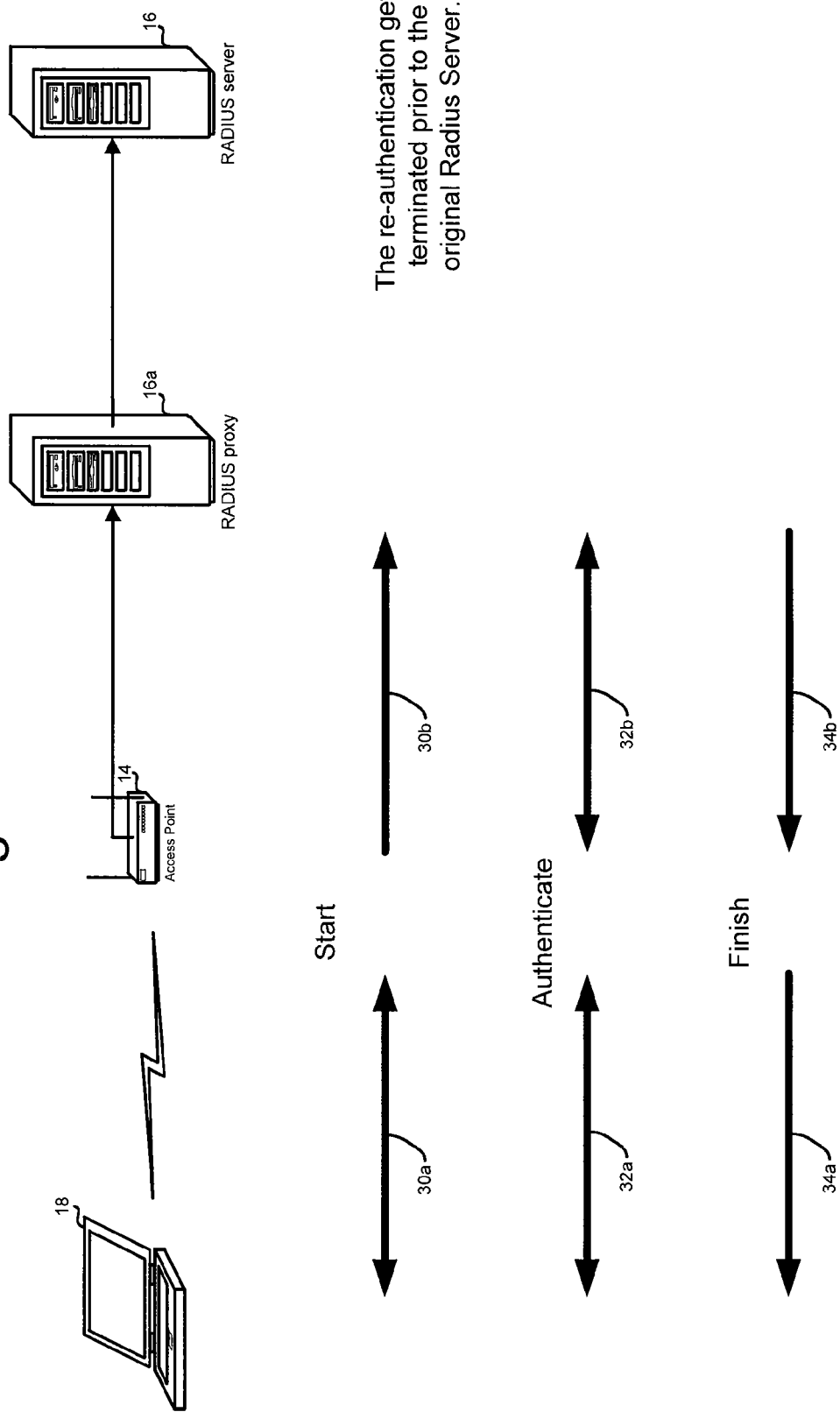

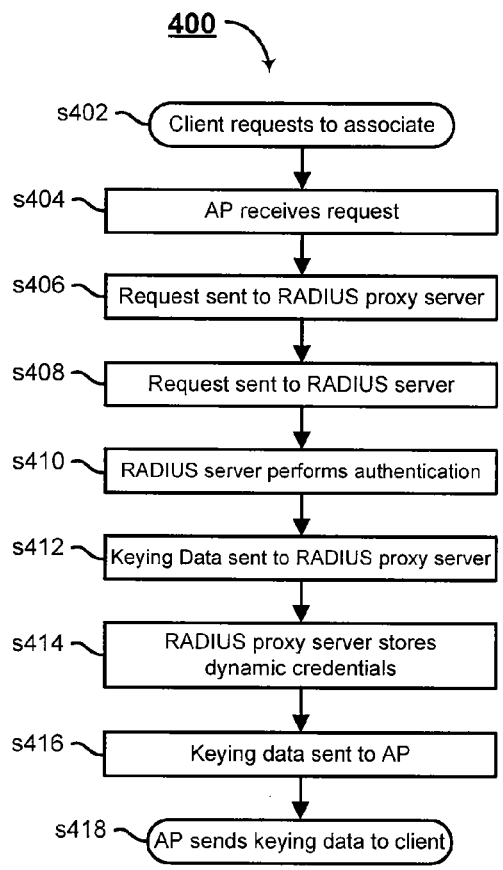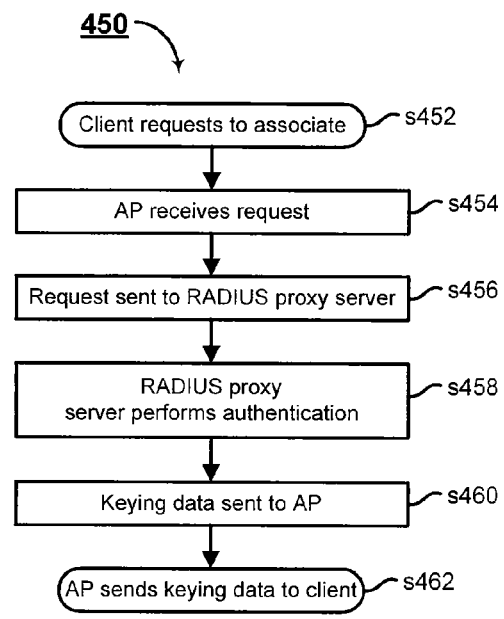
FIG 4a
FIG 4b

US 7,434,044 B2

FAST RE-AUTHENTICATION WITH DYNAMIC CREDENTIALS

BACKGROUND OF THE INVENTION

The present invention generally relates to authenticating wireless clients on a wireless network, and more particularly to a method for authenticating 802.1X clients when roaming between access points.

Most current 802.11 network-level authentication protocols require a substantial amount of real time to re-establish a wireless station's connectivity to the network after that station roams from one access point (AP) to another access point. Typically, when a station associates with a first access point, it has to be authenticated through a true authentication server. When the station roams to a new access point, the station must again authenticate itself with the authentication server which does a full challenge request and response. A new accounting session is then established. This method relies on the initial authentication as a means for key rotation and generates a new accounting session for each roam, causing an unnecessary session teardown and restart.

This delay in re-establishing connectivity greatly impacts 802.11 Quality of service (QoS) to the point that some upper-level protocols, such as Voice-over-IP (VoIP), actually fail. Furthermore, each roam commonly necessitates interaction with a site's Authentication, Accounting, and Authorization (AAA) servers, resulting in a significant increase in server load, to the point at which some servers fail to provide the necessary rate of authentications requests for the 802.11 stations.

Thus, the need exists for a fast, secure and reliable method for authenticating a station when the station roams from one access point to another that decreases traffic to the authentication server.

BRIEF SUMMARY OF THE INVENTION

In view of the aforementioned needs, the invention contemplates a method and system using a proxy authentication server between the authentication server and the network access point. A network access server, typically an access point, receives a request to associate from a client. The network access server then forwards the request to the authentication server via the proxy authentication server. Upon successful authentication, the authentication server returns keying information that is stored by the proxy server and stores the keying information as dynamic credentials. When subsequent re-authentication requests are received by any of the plurality of access points connected to the proxy authentication server, the proxy authentication server handles re-authentication of the client.

The proxy server may re-authenticate the client using either the same type of authentication as the original authentication request or may use a different protocol. For example, the original authentication request may use an Extensible Authentication Protocol-Transport Layer Security (EAP-TLS) and the re-authentication requests may be handled using a Lightweight Extensible Authentication Protocol (LEAP).

In a preferred embodiment, the network access servers are access points (AP) and the authentication server is an Authentication, Accounting, and Authorization (AAA) utilizing an 802.1X network. The RADIUS server is a popular AAA server well known in the art.

One aspect of the invention is that by having re-authentication requests handled by a proxy server, traffic to the authentication server is reduced. In many applications, the proxy authentication server will decrease response time because it can be located physically closer to the network access servers it supports, whereas the authentication server typically serves the entire network and may be physically located a great distance away from the network access servers. Another aspect of the present invention is that re-authentication is driven by the back end system. This provides a solution for systems that do not perform pre-authentication. Yet another aspect of the present invention is that it works well with existing systems. The present invention does not require any changes to clients, and only minimal configuration changes to the network access servers and the authentication server so that re-authentication traffic is routed to the proxy server.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings:

FIG. 2 is a block diagram illustrating the packet exchange flow that typically occurs during an initial authentication;

FIG. 3 is a block diagram illustrating the packet exchange flow that occurs for a reauthentication as contemplated by the present invention;

FIG. 4a is a block diagram showing the steps of a method for initial authentication as contemplated by a preferred embodiment of the present invention;

FIG. 4b is a block diagram showing the steps of a method for re-authentication as contemplated by the present invention;

DETAILED DESCRIPTION OF INVENTION

Throughout this description, the preferred embodiment and examples shown should be considered as exemplars, rather than limitations, of the present invention.

Presently, authentication of a wireless client, also known as a supplicant in 802.1X networking terminology, is performed by Authentication, Accounting, and Authorization (AAA) server, typically a Remote Authentication Dial-In User Server (RADIUS server). The initial authentication is performed by the RADIUS server, and when re-authentication is required, the re-authentication is also handled in the same manner by the RADIUS server.

"Keying materials" for example a Multicast Key and a session key, are established during the initial authentication. The keying material may be used by a proxy authentication server, which is preferably located physically nearer to the roaming device in order to reduce authentication time.

The present invention contemplates using a RADIUS proxy that is inserted between the RADIUS server and a Network Access Server (NAS). In the case of 802.11 networks, the is Access Point (AP) is the NAS. To the NAS, the RADIUS proxy looks like the RADIUS server. To the RADIUS server, the RADIUS proxy appears to be the NAS. After a wireless client authenticates with the RADIUS server, the RADIUS proxy stores the keying material established between the RADIUS server and the wireless client. The RADIUS proxy will then treat the established keying material as the dynamic credentials for the client.

One aspect of the present invention is that the RADIUS proxy does not have the credentials for the client, only the keying material that is used by the RADIUS proxy for dynamic credentials. By moving the RADIUS proxy physically nearer to the NAS where the client is roaming, additional time savings may be realized.

When the client re-authenticates, the RADIUS proxy uses the dynamic credentials. This reduces the load on the AAA server by handling re-authentication traffic that would normally be handled by the server. Furthermore, the type of re-authentication may change from the original authentication protocol. For example, the original authentication may be accomplished via an Extensible Authentication Protocol-Transport Layer Security (EAP-TLS), and the re-authentication may be handled using a Lightweight Extensible Authentication Protocol (LEAP). In addition, if the RADIUS proxy is provided with sufficient information, it may perform the same authentication as the original authentication.

One consideration when determining a re-authentication is the time required to perform the re-authentication. For example, Voice over Internet Protocol (VoIP) and Quality of Service (QoS) applications typically require fast re-authentication.

Figure 1:
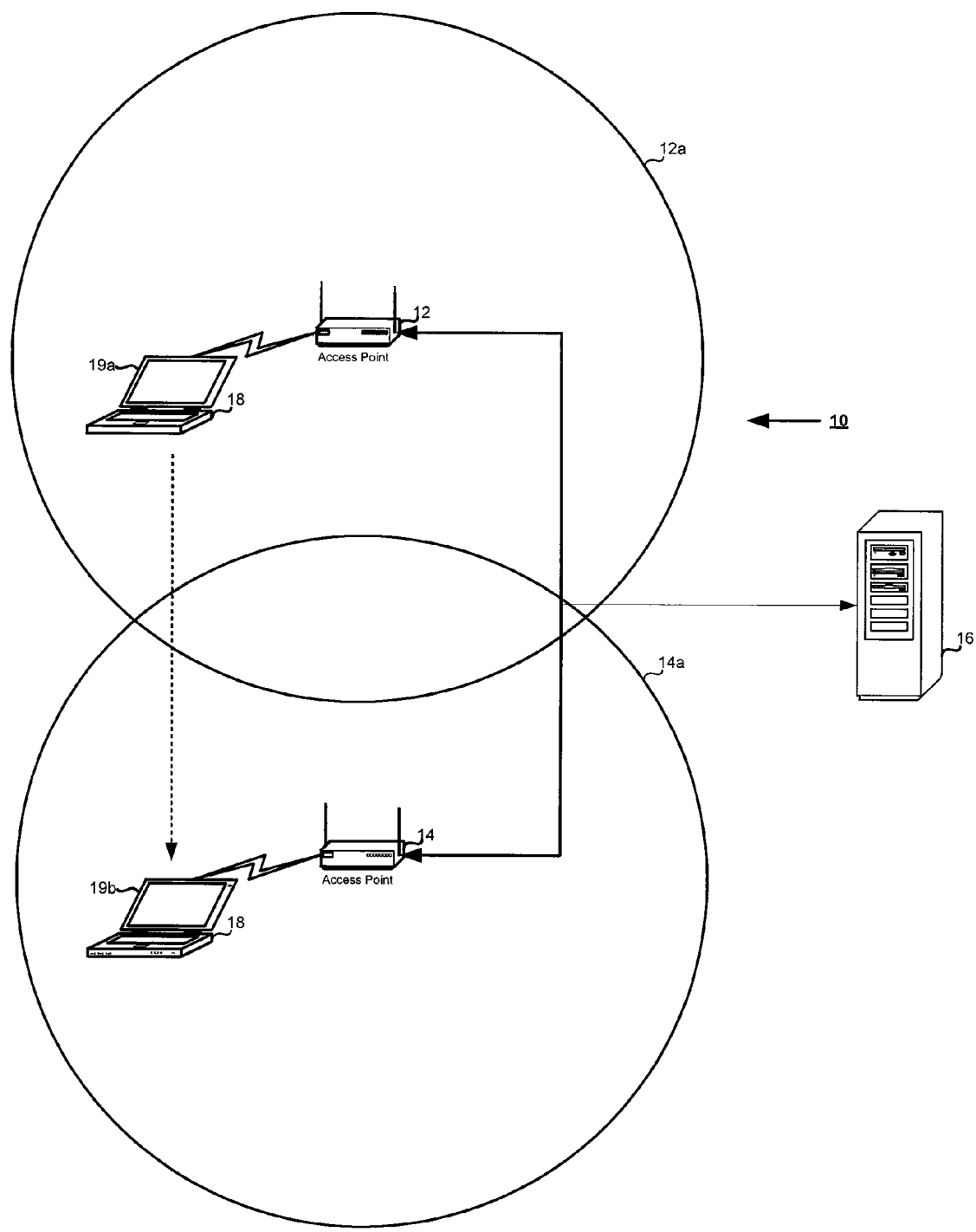
FIG. 1 is a block diagram of a typical 802.11 network with two access points.

As shown in FIG. 1, the client, or station (STA), 18 will associate with an AP 12 while at a first position 19a. When the STA 18 first associates with an AP in the network, it must first authenticate itself. If the STA 18 starts at the first position 19a as shown in FIG. 1, then AP 12 will authenticate the STA via a communication with the AAA (usually a RADIUS) server 16.

When the STA 18 moves from the first position 19a to a second position 19b, it then has to associate with AP 14. In the prior art, this entailed AP 14 communicating with the AAA (usually a RADIUS) server 16 to authenticate the STA 18.

However, referring to FIG. 2, the present invention utilizes a proxy server 16a designed to reduce the volume of communication between the APs 12 and 14 and the AAA server 16. Initial, client (or station), extensible authentication protocol (EAP) authentication with the site's AAA server 16 proceeds as is done currently. At the start, the client 18 has two way communication as shown by 20a with the access point 12. The access point 12 forwards the request to the RADIUS proxy server 16a as shown by 20b. Then as shown by 20c, the RADIUS proxy server 16a then forwards the request to the RADIUS server 16. When the actual authentication steps are handled, there is two way communication between the client 18 and access point 12 as shown by 22a, the access point 12 and the RADIUS proxy server 16a as shown by 22b and between the RADIUS proxy server 16a and the RADIUS server 16 as shown by 22c. After authentication is completed, the RADIUS server 16 sends the authentication data, or keying material, (not shown) to the RADIUS proxy server 16a as shown by 24c, the RADIUS proxy server 16a forwards the keying material to the access point as shown by 24b, and the access point 12 forwarding the keying material to the client 18 as shown by 24a. As will be discussed herein below, the RADIUS proxy 16a stores the authentication data for future re-authentication.

Referring to FIG. 3, there is shown the packet exchanges that occur for reauthentication as contemplated by the preferred embodiment of the present invention. The client 18 attempts to associate to access point 14 and starts the process as shown by 30a. The access point 14 then contacts the RADIUS proxy server 16a as shown by 30b. However, because the client 18 has already been authenticated, the RADIUS proxy server 16a does not pass any packets to the RADIUS server 16. Authentication then begins, two way communication then takes place between the client 18 and access point 14 as shown by 32a, and between the access point and RADIUS proxy server 16a as shown by 32b. When authentication is completed, the data is sent from the RADIUS server 16a to start 14 as shown by 34b, and then from the access point 14 to the client 18 as shown by 34a.

After the client moves from AP 12 to AP 14, if the client 18 were to roam back into AP 12's domain, then AP 12 only needs to re-authenticate the client 18, having the same packet exchange as shown in FIG. 3.

When the client 18 re-authenticates, the authentication method used by the RADIUS proxy server 16a in the re-authentication method may be different than the re-authentication method used by the RADIUS server 16. For example, the RADIUS server 16 may use Extensible Authentication Protocol-Transport Layer Security (EAP-TLS) for authentication, and the RADIUS proxy server 16a may use a Lightweight Extensible Authentication Protocol (LEAP). For another example, the RADIUS server 16 may use Extensible Authentication Protocol-Transport Layer Security (EAP-TLS) for authentication, and the RADIUS proxy server 16a may use a client to AP authentication such as Wi-Fi protected access (WPA). Another option, is that by providing the RADIUS proxy server 16a with sufficient information, the RADIUS proxy server 16a may perform the same authentication as the original authentication. This option would be useful for systems that don't have a reauthentication scheme. Because the re-authentication method does not need to be the same as the initial authentication method, another aspect of the present invention is that the type of re-authentication may be selected to comply with data requirements where latency is an issue, such as a Quality of Service (QoS) implementations.

Referring now to FIG. 4a with continued reference to FIG. 2, there is illustrated the steps 400 performed when a client 18 is initially authenticated. At step s402 the client requests to associate with an AP 12. At step s406, the AP 12 passes the request to the RADIUS proxy server 16a. At step s408 the RADIUS proxy server 16a sends the request to the RADIUS server 16. At step s410, The RADIUS server performs the authentication. Typically this entails bidirectional communication between the client 18 and AP 12, the AP 12 and the RADIUS proxy server 16a, the RADIUS proxy server 16a and the RADIUS server 16, as illustrated by 22a, 22b, and 22c respectively. After the client has successfully authenticated, then at step s412 the RADIUS server 16 sends keying data to the RADIUS proxy server 16a. At step s414 the RADIUS proxy server 16a stores dynamic credentials based on the keying data. The dynamic credentials may comprise the keying data, or the RADIUS proxy server 16a may generate dynamic credentials for the client 18. At step s416 the Keying data is sent to the AP 12. This step may also be performed simultaneously with step s414 to save time. Finally, at step s418 the AP 18 sends the keying data to the client 18.

Referring now to FIG. 4b with continued reference to FIG. 3, once the client 18 has been authenticated, then the client 18 may be re-authenticated using the steps 450 shown in FIG. 4b. Beginning at step s452 the client 18 requests to associate. At step s454 the AP 14 receives the request, and at step s456 the request is sent to the RADIUS proxy server 16a. Steps s452, s454 and s456 are usually identical to steps s402, s404 and s406 respectively. However, at step s458, the RADIUS proxy server 16a performs the authentication. After the authentication is confirmed, then at step s460 keying data is sent to the AP 14 which sends the keying data to the client at step s462. It should be noted that if the client were to subsequently roam back to AP 12, the same steps 450 taken to re-authenticate the client with AP 14 may be used.

Figure 5:
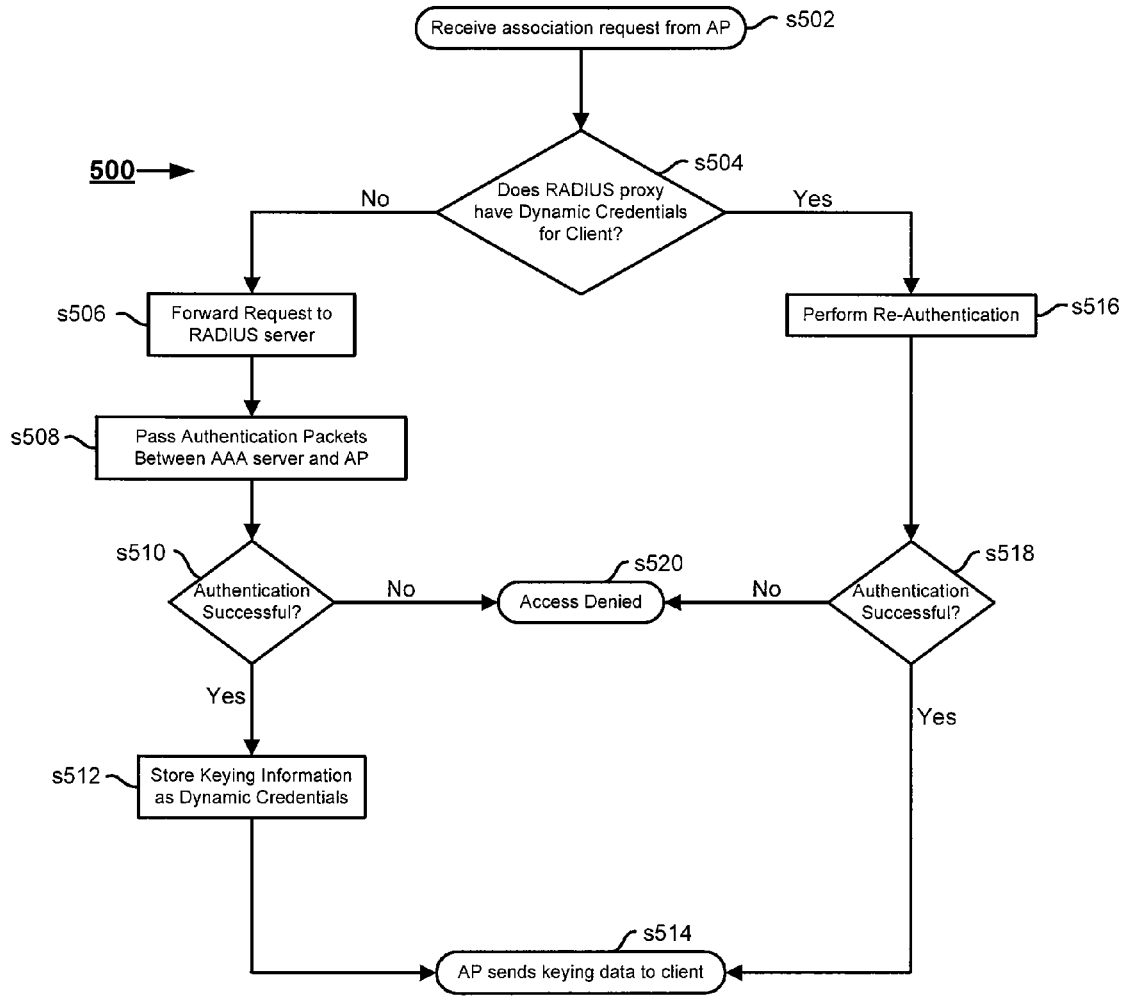
FIG. 5 is a block diagram showing the steps taken by the proxy server as contemplated by a preferred embodiment of the present invention.

Referring now to FIG. 5, there is shown a flow chart illustrating the steps 500 normally taken by the RADIUS proxy server 16a when handling an authentication request. The process begins when the RADIUS proxy server 16a receives an association request from an AP 12, the AP 12 receiving the request from a client. At step s504 the RADIUS proxy server 16a determines if it already has dynamic credentials for the client.

If at step s504 the RADIUS proxy server 16a has dynamic credentials for the client 18, then the client 18 is re-authenticated, and re-authentication is performed at step s516. At step s518 if the re-authentication was successful, then the keying material is sent to the AP 12. If at step s518 re-authentication was not successful, then the access is denied as shown in s520.

If at step s504 the RADIUS proxy server 16a determines it does not have dynamic credentials for the client, then a regular authentication procedure must be done and processing proceeds to step s506 wherein the request is forwarded to the RADIUS server 16. As shown at step s508, the RADIUS proxy server then passes authentication packets between the RADIUS server 16 and the AP 14. Once authentication is completed, then at step s510 it is determined whether authentication was successful. If at step s510 authentication was successful, the RADIUS proxy server 16a stores the keying information as dynamic credentials. However, the RADIUS proxy server 16a may generate different dynamic credentials for the client 18, which normally would be based on the keying materials. Finally, at step s514 the keying material is sent to the AP 14. If at step s510 it is determined that authentication was not successful, then as shown at step s520 access is denied.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. An apparatus, comprising:
    a table for storing authentication data;
    a proxy authentication server configured to be coupled to a network, the proxy authentication server is in data communication with the table;
    wherein the proxy authentication server is configured to intercept an authentication request for a client from a first access point;
    wherein the proxy authentication server is responsive to intercepting the authentication request for the client to determine whether authentication data for the client is stored in the table;
    wherein the proxy authentication server is responsive to determining authentication data for the table is not stored in the table to forward the authentication request to an authentication server;
    wherein the proxy authentication server is configured to intercept a response to the forwarded authentication request from the authentication server, the response comprising authentication data for the client;
    wherein the proxy authentication server is configured to store the authentication data for the client from the response in the table;
    wherein the proxy authentication server is configured to send data derived from the authentication data to the first access point to enable the first access point to establish a communication session with the client;
    wherein the proxy authentication server is configured to intercept an authentication request for the client from a second access point;
    wherein the proxy authentication server is responsive to intercepting the authentication request for the client from the second access point to determine whether authentication data for the client is stored in the table; and
    wherein the proxy authentication server is configured to send data derived from the authentication data to the second access point to enable the second access point to establish a communication session with the client.

2. The apparatus of claim 1, wherein the authentication data for the client comprises a session key.

3. The apparatus of claim 1, wherein the authentication server is a Remote Authentication Dial-In User Service (RADIUS) compatible server.

4. The apparatus of claim 1, wherein the client is a wireless client, the first access point is a wireless access point and the second access point is a wireless access point.

5. The apparatus of claim 1, wherein the authentication data for the client comprises keying material;
    wherein the data sent to the first access point is authentication data for authenticating the client with a first authentication protocol; and
    wherein the data sent to the second access point is authentication data for authenticating the client with a second authentication protocol.

6. The apparatus of claim 5, wherein the first authentication protocol is an Extensible Authentication Protocol-Transport Layer Security (EAP-TLS) compatible protocol.

7. The apparatus of claim 6, wherein the second authentication protocol is a Lightweight Extensible Authentication Protocol (LEAP) compatible protocol.

8. The apparatus of claim 6, wherein the second authentication protocol is a WiFi Protected Access (WPA) compatible protocol.

9. The apparatus of claim 1, wherein the proxy authentication server is configured to intercept an authentication request for the client from a third access point;
    wherein the proxy authentication server is responsive to intercepting the authentication request for the client from the third access point to determine whether authentication data for the client is stored in the table; and wherein the proxy authentication server is configured to send data to the third access point to enable the third access point to establish a communication session with the client.

10. The apparatus of claim 1, wherein the proxy authentication server is configured to intercept a subsequent authentication request for the client from the first access point;
wherein the proxy authentication server is responsive to intercepting the subsequent authentication request for the client from the first access point to determine whether authentication data for the client is stored in the table; and
wherein the proxy authentication server is configured to send data to the first access point to enable the second access point to establish a communication session with the client.

11. An apparatus, comprising:
means for storing authentication data;
means for intercepting a first request to authenticate a client from a first access point to an authentication server;
means for determining whether authentication data for the client is stored by the means for storing authentication data responsive to the means for intercepting a request to authenticate a client from a first access point;
means for forwarding the first authentication request to an authentication server responsive to the means for determining ascertaining the means for storing authentication data does not have authentication data for the client;
means for receiving authentication data for the client from the authentication server and storing the authentication with the means for storing authentication data;
means for sending data derived from the authentication data to the first access point enabling the first access point to establish a communication session with the client;
means for intercepting a second request to authenticate the client from a second access point to an authentication server;
means for acquiring authentication data for the client is stored by the means for storing authentication data responsive to the means for intercepting a request to authenticate the client from a second access point; and
means for sending data derived from the authentication data to the second access point enabling the second access point to establish a communication session with the client.

12. The apparatus of claim 11, wherein the mean for sending data to the first access point sends keying material for the first access point to communicate with the client.

13. The apparatus of claim 11, wherein the mean for sending data to the second access point sends keying material for the second access point to communicate with the client.

* * * * *